United States Patent [19]

Holmes et al.

[11] 3,859,631

[45] Jan. 7, 1975

[54] METHOD AND APPARATUS FOR DECODING BINARY DIGITAL SIGNALS

[75] Inventors: Robert S. Holmes, Rochester; Walter M. Katz, Pittsford, both of N.Y.

[73] Assignee: ComSci Data, Inc., Rochester, N.Y.

[22] Filed: July 16, 1973

[21] Appl. No.: 379,765

[52] U.S. Cl. ........... 340/146.1 R, 325/323, 329/126

[51] Int. Cl. .......................................... H03k 13/32

[58] Field of Search ............ 340/146.1 R, 146.1 AB; 325/42, 323; 329/110, 126

[56] References Cited

UNITED STATES PATENTS

| | | | |
|---|---|---|---|
| 3,165,893 | 11/1964 | Harel | 340/146.1 AB |
| 3,331,051 | 7/1967 | Simon | 340/146.1 R |
| 3,335,224 | 8/1967 | Meslener et al. | 340/146.1 AB |
| 3,386,079 | 5/1968 | Wiggins | 340/146.1 R |
| 3,417,333 | 12/1968 | Atzenbeck | 340/146.1 AB |
| 3,671,935 | 6/1972 | Lipp et al. | 340/146.1 AB |
| 3,761,809 | 9/1973 | Lockitt et al. | 329/126 |

*Primary Examiner*—Charles E. Atkinson
*Attorney, Agent, or Firm*—Roger Aceto

[57] ABSTRACT

Disclosed is a method and apparatus for decoding binary digital signals recorded or transmitted in a phase code wherein the direction of the transition at the center of the bit determines whether the value of the bit is a binary one or zero. The apparatus includes means for locking on to the frequency of transmission and a counter which operates at a multiple of the bit cell frequency and which begins to count responsive to the level and position of the signal in the bit cell. The counter is preset at the beginning of each bit cell with the contents of the counter at the end of each bit cell determining whether the value of that bit cell is a one or a zero.

10 Claims, 3 Drawing Figures

METHOD AND APPARATUS FOR DECODING BINARY DIGITAL SIGNALS

BACKGROUND OF THE INVENTION

The present invention relates generally to a method and apparatus for decoding binary signals and more particularly to a method and apparatus for decoding such signals presented in a particular type of phase encoding scheme.

For purposes of the present invention it will be sufficient merely to say that the data recording scheme employed herein is well known in the art and consists of a series of bit cells. The binary value of a bit cell is a "zero" if an analog signal in the bit cell undergoes a high-to-low transition in the center of the bit cell or conversely, the value of a bit cell is a "one" if the analog signal undergoes a low-to-high transition in the center of the bit cell. While some implementation of such a phase encoding scheme may use an opposite convention for the "zero" and "one" value of the bit cells, for convenience, we will describe the present invention in terms of the high and low convention set out above.

Decoding techniques of the prior art simply look at the transition point in the bit cell to determine whether the value of cell was a "one" or a "zero." The problem, however, of using such a system to decode the bit signal is that noise or other spurious signal may cause a transition to occur in the bit cell in addition to the transition caused by the recorded data. The decoding apparatus then becomes confused because it is programmed to interpret only one transition in each bit cell. Accordingly, when a transition due to noise or other spurious signal occurs, there is at least a loss of data associated with that bit cell and at most a loss of the complete record or string of bits.

In order to minimize the occurrence of such events, the prior art usually relied upon standard analog signal processing techniques such as shielding, sensitive amplifiers, better quality recording media, sophisticated phase compensation and the like. Although these techniques reduce the instance of noise generated errors, such errors still occur even in high quality instruments on the order of one error each $10^8$ bits. By use of the present invention, such errors have been reduced to less then one error each $1.6 \times 10^9$ bits.

In the present invention, noise generated errors are greatly eliminated by averaging the value of the bit over the entire bit cell. This is accomplished by a counter which is preset at the start of each bit cell, the value of the bit cell being determined by how close the count at the end of the bit cell is to one or another preselected counts.

SUMMARY OF THE INVENTION

The present invention may be characterized in one aspect thereof by the provision of a phase lock loop in association with a counter, the phase lock loop acting to lock the operation of the counter on to a multiple of the bit frequency; means for presetting the counter at the start of each bit; and logic circuitry which causes the counter to operate in a predetermined manner depending upon the level of the signal in the bit cell and whether that signal is in the first or the second half of the bit cell, the value of the bit cell being one or zero depending upon the contents of the counter at the end of the bit cell as determined by the phase lock loop.

OBJECTS OF THE INVENTION

One object of the present invention is to improve the reliability of decoding binary digital signals recorded or transmitted in a phase encoding scheme wherein the binary value of a bit is determined by the direction of the signal transition at the center of the bit.

Another object of the present invention is reduce the instance of loss of data when decoding binary digital signals recorded or transmitted in such a phase encoding scheme.

A further object of the present invention is to provide means for quantitatively evaluating the quality of data transmitted or recorded in such a phase encoding scheme.

A still further object of the present invention is to obtain a high degree of reliability in data transmission and recording using the phase encoding scheme described which eliminates the need of expensive and high quality recording devices and media or sophisticated analog signal processing techniques.

These and other objects, advantages and characterizing features of the present invention will become more apparent upon consideration of the following detailed description thereof when taken in connection with the accompanying drawings depicting the same.

DESCRIPTION OF THE PREFERRED EMBODIMENTS

Figure 1:
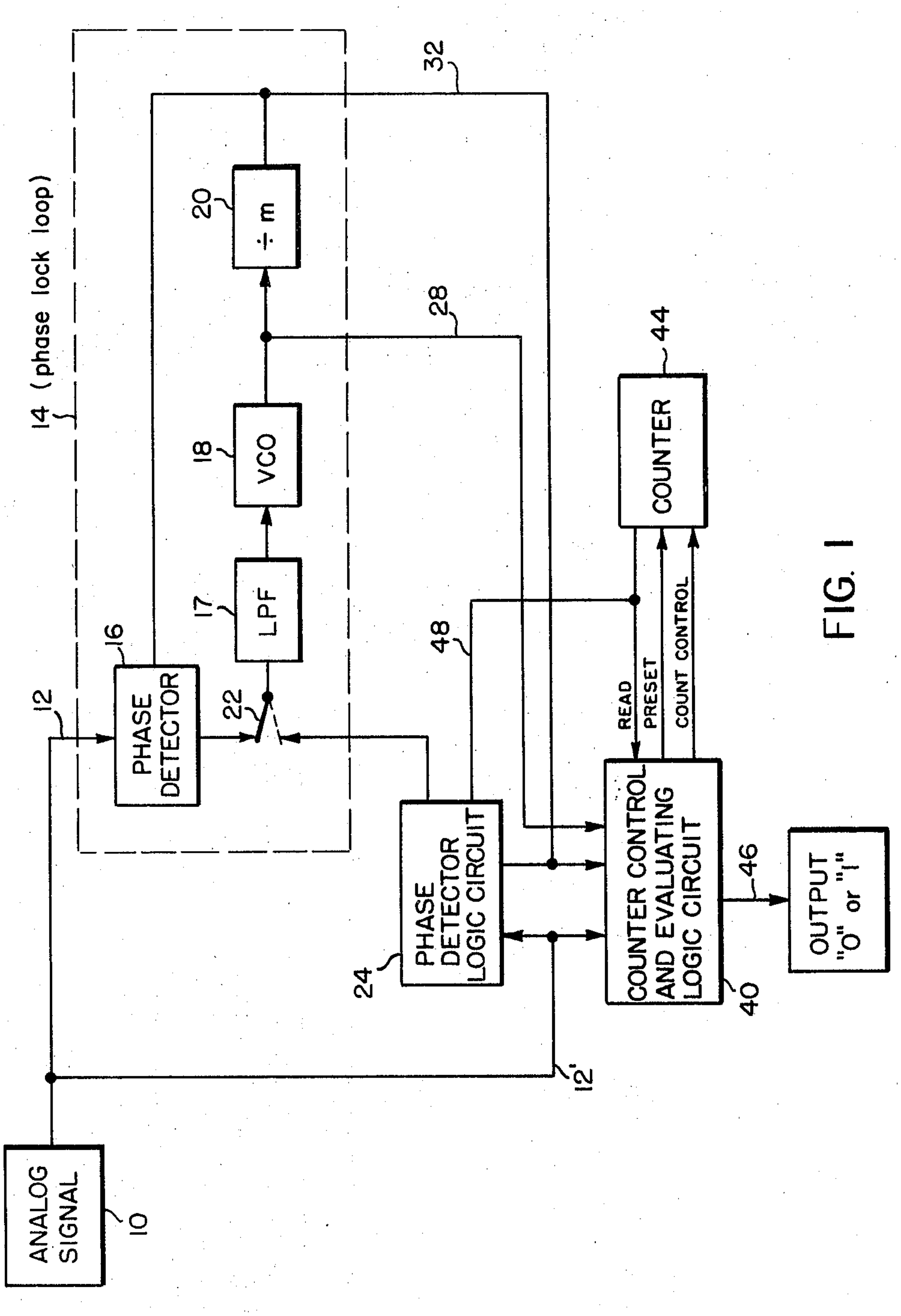
FIG. 1 is a schematic block diagram of the apparatus of the present invention.

Referring to the drawing, FIG. 1 shows the analog signal 10 which can be from any recorded or unrecorded source (not shown) such as a radio transmission, magnetic tape, disc, or the like. The analog signal represents a stream of bit cells wherein the binary value of each cell is either a one or a zero, depending upon the direction of transition of the signal in the center of the bit cell. It shall be assumed, for purposes of describing the invention and by way of illustrating the invention only, that a positive transition (from low to high) at the center of the bit cell is to be interrupted as a binary "one" and that a negative transition (from high to low) in the center bit cell is to be interrupted as a binary "zero." It should be understood that this convention is for convenience only and that some implementations of phase encoding could use the opposite sign convention for zero and one bits.

In any event, the usual practice is to have the block of data to be decoded preceeded by a preamble consisting of a repetitive bit pattern. This preamble allows a phase lock loop to lock onto the bit cell frequency using standard phase detecting techniques. Once the lock is achieved, the system goes into a data decode mode. The standard phase lock loop is shown in FIG. 1 at 14 and the analog signal input to the loop is shown at 12. The loop consists of a phase detector 16, a low pass filter (LPF) 17, a voltage controlled oscillator (VCO) 18 and a frequency divider 20. Phase lock loop 14 is well known in the art and will not be described in detail accept to say that when used in connection with the prior art it increases or decreases the speed of the decoding equipment in order to keep the decoding equipment in phase with the incoming analog signal. In the present invention, phase lock loop 14 merely functions to lock the voltage controlled oscillator 18 onto a multiple frequency of the preamble of the incoming analog signal. After locking on to the preamble, phase detector 16 is dropped out of the loop and the analog signal input is derived from 12', which is the input to a phase detector logic circuit 24. To accomplish this, a switch 22 is operated and moved to the position shown in dotted line to connect the output of the phase detector logic circuit 24 with the rest of the loop 14 consisting of LPF 17, the VCO 18 and frequency divider 20.

Thus, as shown in FIG. 1, the analog signal input at 12' is fed to a second phase lock loop consisting of phase detector logic circuit 24, LPF 17, VCO 18, and frequency divider 20. The function of VCO 18 is to produce a first output 28 from the loop. This first output is a reference signal at some multiple *m* of the bit cell frequency of the incoming data. The function of the frequency divider 20 is to divide this frequency by *m* to produce a second output 32 from the loop. This second output can be used to define the center and boundaries of a bit cell.

In any event output 32, which defines the bit cell, and the VCO output 28, which represents *m* intervals within the bit cell are both applied to a counter control and evaluation logic circuit 40. Also, applied to circuit 40 at 12' is the analog signal 10.

One function of control circuit 40 is to operate a counter 44. Counter 44 operates at a multiple of the bit frequency determined by loop output 28. As set out hereinabove, the counter is capable of either counting up or counting down. It should be understood that other counting techniques may be used in connection with the present invention (e.g. uni-directional counting) and that describing counter 44 as having the ability to count up or down is by way of illustration only and that the present invention need not necessarily be limited thereto.

In any event, control circuit 40 presets the counter at the start of each bit cell as defined by loop output 32. The control circuit then directs the counter to count up or down depending upon the level of the incoming analog signal at 12' and the instantaneous position of that signal in the bit cell as defined by loop output 32. At the end of the bit cell, again as defined by loop output 32, circuit 40 reads the counter and issues an output signal 46 which indicates whether the value of the cell is a binary zero or one.

Completing the present invention is a connection 48 by which the phase detector logic circuit 24 is able to read counter 44, the purpose of which will be described hereinbelow.

Bit Cell Value Determination

Assuming that the preamble portion of the analog signal is terminated and that the decoding apparatus is in phase with the block of data, the decoding of the information contained in analog signal 10 will proceed as follows. Counter control and evaluation logic circuit 40 will reset counter 44 at the start of each bit cell. Logic circuit 40 recognizes the beginning, middle and end of each bit cell from loop output 32. From analog signal 12' the logic circuit determines whether the incoming analog signal is at some predetermined low level or high level. Consequently, logic circuit 40 directs the counter to count up if the analog signal level at input 12' is at some predetermined low level during the first half of the bit cell, and down if the analog signal level is at some predetermined high level. When the middle of the bit cell is reached as determined by output 32, circuit 40 will direct counter 44 to count up if the analog signal is at some predetermined high level in the second half and down if the analog signal is at some predetermined low level in the second half. At the end of the bit cell, as determined again by output 32, logic circuit 40 reads the counter. If the count is greater than some preselected number, logic circuit 40 will indicate that the value of that bit cell is one. If the count is equal to or less than the preselected number, the logic circuit will indicate that the value of the bit cell is zero.

Figure 2:
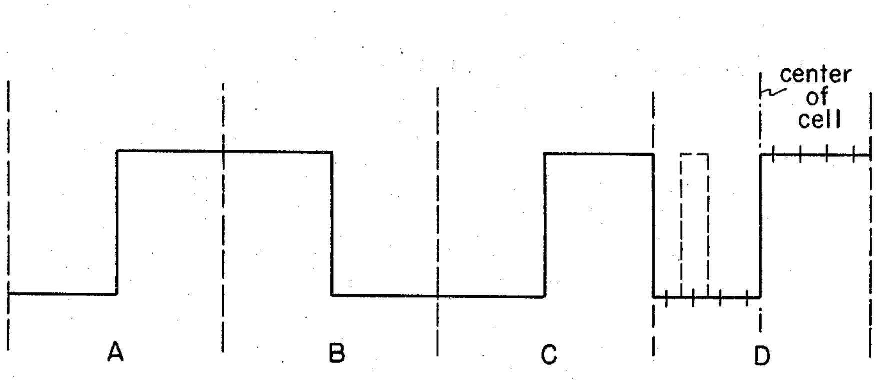
FIG. 2 is a diagram showing a series of bits wherein the last bit contains a spurious signal.

A portion of a typical block of data consisting of four bit cells is shown in FIG. 2, the cells being consecutively labeled A–D. Assuming that counter 44 is driven at a frequency 8 times the bit frequency, there will be 8 counts performed by the counter for each bit cell. Assume also that counter 44 is preset to zero at the beginning of each bit cell. Accordingly, for each binary one where the transition is from low to high, as shown for example in bits A and C, the count will be eight. For a binary zero, where the transition is from high to low as illustrated in bit cell B, the count will be minus eight. In such a situation, then, logic circuit 40 will assign a binary value of one to any bit cell where the counter reading is greater than zero and a binary zero where the count reading is less than zero. Thus, if a spurious signal appears in the bit cell, the value assigned to the bit cell will still be binary one where the count is greater than zero. Such a situation is shown in FIG. 2 at bit cell D, wherein the spurious signal is shown in dotted line. Here, the count for each increment of counter 44 will proceed as follows, 1, 0, 1, 2, 3, 4, 5, 6. Since the value of the count is greater than zero, the presence of the spurious signal is overlooked so that the value of the bit cell is read as a binary one.

Bit Cell Phase Determination

In order to insure that the decoding device is in phase with the analog signal, phase detector logic circuit 24 samples counter 44 through connection 48. The sampling is done at the middle of the bit cell as determined by output 32 of frequency divider 20. After taking a sample reading of counter 44, phase detector logic circuit 24 anticipates whether the binary value of the bit cell will be a one or a zero. At the same time, analog signal 10 at input 12' is sampled. By anticipating the value of the bit cell and comparing this anticipated value with the level of the analog signal, phase logic circuit 24 can determine whether or not the center-of-cell transition has occurred. If a transition has not occurred, the phase detector logic circuit will issue a control signal to VCO 18 through switch 22 and LPF 17 for either speeding up or slowing down the decoding apparatus.

Figure 3:
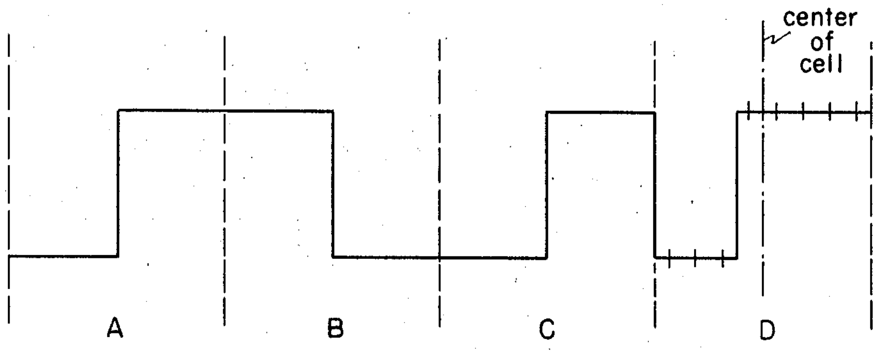
FIG. 3 shows a series of bit cells wherein the last bit shown has its transition not occurring in the center of the bit.

A typical out-of-phase situation is illustrated in FIG. 3. Here a portion of a data block consisting of 4 bit cells is shown, the cells being consecutively labeled A–D. The last cell, FIG. 3–D, illustrates a positive going change, that is a bit cell value equal to binary 1, which occurs ahead of the center of the bit cell. The sample count, at the center of the bit cell, has a value of 2 so that a binary one value can be anticipated. However, the analog signal at this point is at a high level indicating that the transition from low to high has already occurred. Since the transition has already occurred, the phase lock loop is ahead of the analog signal frequency and accordingly, phase detector logic circuit 24 will issue a correction voltage to lower the frequency of the phase lock loop. Likewise, if the count sample anticipates a binary zero value for the bit cell and the signal level is low indicating the transition has already occurred, a correction voltage is generated to lower the frequency of the phase lock loop. Conversely, if the sample count indicates a one value and the transition has not yet occurred, i.e. the signal level is low; or the sample count indicates a zero value for the bit cell, and the transition has not yet occurred i.e. the signal level is high, then phase detector logic circuit 24 will issue a control voltage to raise the frequency of the phase lock loop.

Thus, it should be appreciated that the present invention accomplishes its intended objects in providing a method and apparatus for improving reliability and reducing the instance of loss of data when decoding binary digital signals recorded or transmitted in the described phase encoding scheme. The use of counter 44 and the counter control and evaluation logic circuit to sum the analog signal over the entire bit cell greatly reduces the instance of error due to noise or other spurious signals. The present invention also provides means for quantitatively evaluating the quality of data transmission or recording. In this respect, as long as the quality of the data remains high the count of counter 44 at the end of each bit cell will be consistent. As the quality of the data begins to deteriorate the count at the end of each bit cell in the counting scheme described would approach zero. Accordingly, it is an indication that the data being transmitted is marginal when the count at the end of each bit cell frequently reaches a predetermined range of numbers around zero. For example, if the count was within some range of values say, for example, between −4 and +4 the binary one or zero value still could be assigned. In addition, the notation could be made that the assigned binary value was based on marginal data and that the bit must be reread or ignored.

It should be obvious that various modifications may be made in the present invention as described herein by those skilled in the art without changing the spirit and scope of the invention. For example, the same results may be achieved by using a counter which only counts up during the first half of the bit cell if the signal is high and up during the second half of the bit cell if the signal is low and which otherwise does not count. Here, of course, the predetermined range of numbers indicating marginal data would also change.

In any event, having thus described the invention in detail what is claimed as new is:

1. Apparatus for decoding a recorded or transmitted analog signal representing a stream of bits wherein a signal transition occurring at the center of a bit is decoded as a binary "1" or "0" depending upon the direction of the transition, said apparatus comprising:

a. a phase lock loop capable of locking onto a multiple of the bit frequency of the incoming stream of bits, said loop having
   a first output at a preselected multiple of said bit frequency and
   a second output defining the beginning and end of each bit;

b. a counter capable of operating at a preselected multiple of said bit frequency as determined by said first output;

c. means acting responsive to said second output for presetting said counter at the beginning of each bit; and d. logic circuit means receiving said analog signal and both said first and second loop outputs, said logic circuit means causing said counter to operate responsive to said first output in a mode which depends upon the level of the analog signal and the instantaneous position of the signal within said bit as determined by said second output, said logic circuit including
   means examining the contents of said counter at the end of each bit cell as determined by said second output for determining the binary value of said bit.

2. Apparatus as in claim 1 in which said logic circuit means presets and reads said counter at the beginning and end of each bit as determined by said second output.

3. Apparatus as in claim 1, wherein said logic circuit means assigns a predetermined binary value if the contents of said counter are above a predetermined count, and assigns a binary value opposite to said predetermined binary value if the contents of said counter are equal to or below said predetermined count.

4. Apparatus as set forth in claim 1, wherein said second output also defines the center of each bit and said counter is a bidirectional counter, said logic circuit means causing said counter to count in one direction whenever the level of the analog signal is low in the first half and high in the second half of the bit and in the opposite direction whenever the level of the analog signal is high in the first half and low in the second half of the bit.

5. Apparatus as set forth in claim 1, wherein said second output also defines the center of each bit and said counter is uni-directional counter, said logic circuit means causing said counter to count or not count depending upon the level of the analog signal and the instantaneous position of the analog signal in the first or second half of the bit.

6. Apparatus as in claim 1, wherein said second output also defines the center of each bit and said phase lock loop includes a phase detector circuit which generates a phase error signal responsive to the contents of said counter and the instantaneous level of said analog signal at the center of the bit as determined by said second output.

7. Apparatus as in claim 1, wherein said logic circuit means functions to determine whether or not the analog signal within any bit may have been marginally decoded, said determination being dependent on whether or not the contents of said counter is within a predetermined range of numbers.

8. A method for decoding an analog signal representing a stream of bits wherein the binary value of each bit is determined by the direction of the signal transition at the center of the bit, said method comprising the steps of:

a. generating a first signal at some frequency which is a multiple of the bit frequency;

b. generating a second signal defining the beginning, center and end of each bit;

c. operating a counter responsive to said first signal and in a mode which depends upon the level of the analog signal and the instantaneous position of said analog signal within said bit as defined by said second output; and d. reading said counter at the end of each bit as defined by said second signal and assigning a binary one or zero value to said bit depending upon whether the contents of said counter is above or below a predetermined number.

9. In an apparatus for decoding a recorded or transmitted analog signal representing a stream of bits wherein a signal transition occurring at the center of a bit is decoded as a binary "1" or "0" depending upon the direction of the transition, means for generating a reference signal synchronous to the analog signal comprising:

a. a phase lock loop having a first output at a multiple of the bit frequency and a second output defining the beginning and middle of each bit;

b. a counter driven at a multiple of the bit frequency as determined by said first output;

c. means presetting said counter at the beginning of each bit as determined by said second output;

d. a logic circuit which causes said counter to operate in a mode which depends upon the level of said analog signal; and e. a phase detector including means for generating an error signal responsive to the contents of said counter and the instantaneous level of said analog signal at the center of the bit cell as determined by said second loop output.

10. Apparatus as in claim 9 wherein:

a. said second output also defines the end of each bit;

b. said logic circuit receiving the analog signal and causing said counter to operate responsive to said first output in a mode which depends upon the level of the analog signal and the instantaneous position of the analog signal within the bit as defined by said second output; and c. means reading said counter at the end of each bit as defined by said second output for assigning a binary one or zero value to said bit depending upon whether the count at the end of the bit is above a predetermined count.

* * * * *